(12) United States Patent
Dirks

(10) Patent No.: US 6,412,424 B1
(45) Date of Patent: Jul. 2, 2002

(54) TAILGATE DISPLAY TABLE

(76) Inventor: Dave Dirks, 17815 E. 23, Monticello, IA (US) 52310

( * ) Notice: Subject to any disclaimer, the term of this patent is extended or adjusted under 35 U.S.C. 154(b) by 0 days.

(21) Appl. No.: 09/718,080

(22) Filed: Nov. 22, 2000

(51) Int. Cl.[7] ............................................. A47B 23/00
(52) U.S. Cl. ......................................................... 108/44
(58) Field of Search .............................. 108/27, 60, 61, 108/90, 44, 45; 296/37.1, 37.6

(56) References Cited

U.S. PATENT DOCUMENTS

| | | | | |
|---|---|---|---|---|
| 1,345,444 A | * | 7/1920 | Horvitz | |
| 1,872,849 A | * | 8/1932 | Townes | |
| 3,709,159 A | * | 1/1973 | Oglesby, Jr. | 108/44 |
| 4,452,151 A | * | 6/1984 | Jarrad | 108/44 |
| 4,494,465 A | * | 1/1985 | Fick, Jr. | 108/44 |
| 4,995,322 A | * | 2/1991 | Frederick | 108/44 |
| 6,045,172 A | * | 4/2000 | Thomas et al. | 108/44 X |
| 6,193,294 B1 | * | 2/2001 | Disner et al. | 108/44 X |

* cited by examiner

*Primary Examiner*—Jose V. Chen
(74) *Attorney, Agent, or Firm*—James C. Nemmers

(57) ABSTRACT

A combination table and storage cap, preferably having a cap configured in the shape of a tailgate is disclosed. The cap inner surface is adapted to hold picnic, tailgate party, sporting, advertising, promotional, or other goods. The cap outer surface is adapted to display logos, emblems, words, or designs. The cap may, through removal and reattachment, or through a sliding or pivoting motion, move between a cap or horizontal position and a display or vertical position.

2 Claims, 2 Drawing Sheets

TAILGATE DISPLAY TABLE

BACKGROUND OF THE INVENTION

Tailgating is a popular activity surrounding football games, baseball games, car races, concerts and other recreational or sporting events. The majority of people picnicking or tailgating at such events normally carry their supplies in the trunk of a vehicle, the bed of a truck or the passenger compartment of a van or other vehicle. Typically, if desired, revelers may bring a portable table such as a card table or collapsible bench to set up and hold supplies.

Attempts have been made to provide means for securing tables within automobile trunks to conserve storage space. An example of such a table is shown in U.S. Pat. No. 4,452,151. In addition, the prior art discloses numerous devices that may be used as a table. An example of such a device is the pickup bed-extender as illustrated in U.S. Pat. No. 4,023,850. U.S. Pat. No. 5,649,731 illustrates a work bench on vehicle mounted tracks which may be extended from the rear portion of a pickup bed with drop-down legs. A pivotable table attached to rear doors or truck tailgates is disclosed in U.S. Pat. No. 4,236,461. Numerous other workbench, seat, or other support surface devices exist for use with trucks, vans, or cars, and these devices are adapted for convenient storage in a collapsed position, often concealed in a truck bed, (U.S. Pat. No. 5,823,595), bed and tailgate (U.S. Pat. No. 5,215,346), trunk (U.S. Pat. No. 4,452,151), or other vehicle wall (U.S. Pat. No. 1,790,468) when not in use.

Although there exists an assortment of vehicle-mounted or vehicle-concealed tables, benches, and other support surfaces, there has been and remains a need for a device that provides a support surface and that also provides storage and display functionality in an embodiment adapted for use with or without having a surface that may comprise an integral portion of a vehicle. The present invention may be practiced in embodiments that incorporate the use of a typical or "standard" truck tailgate. Alternatively, the present invention may be practiced separately from a vehicle and may simply comprise a useful table and display apparatus that may be used for picnicking, tailgating, or product display. Applications therefore include social, recreational, and entertainment uses in addition to use by professionals, volunteers, hobbyists, or others at trade shows, product or service fairs, or any other activity wherein a support surface and a display surface are desired.

SUMMARY OF THE INVENTION

The present invention is a table having a movable or removable cap mounted thereon. The movable cap is preferably a pivotal cap that may be moved between at least two generally stable positions and that may be mounted by a variety of convenient means. Examples of such means include locking pins, snaps, or other means adapted for use with a removable cap, or attachments such as sliding pivot arms, hinged arms, telescoping connectors, or extension rods that are preferably adapted for use with a sliding cap. If removable, the cap may be mounted by any convenient means wherein the cap may be secured to the table in at least two different positions, i.e. a generally horizontally disposed "closed-cap" position, and a generally vertically disposed "display" position.

The present invention may be practiced such that the cap element comprises an actual or a model pickup tailgate. Such a cap allows for the use of a pickup tailgate handle as part of a locking mechanism to secure the cap to the table surface when in the "closed-cap" position. In addition, the moveable cap structure is adapted to allow for the inclusion of storage space within the cap. Whether in the form of a tailgate or otherwise, this cap structure is preferably in a form that may accommodate substructures adapted to hold and organize items such as promotional literature (for use in advertising), team paraphernalia, picnic supplies, or other items.

Finally, the cap that may be disposed in a generally vertical display position may serve as a display surface that includes writing, designs, or symbols that may be impressed, affixed, imprinted, or otherwise formed therein to allow fans to illustrate their support, to carry an image or logo for advertisers or promoters, or to simply provide an attractive and appropriate image or message for the desired application.

DESCRIPTION OF THE PREFERRED EMBODIMENT OF THE INVENTION

Figure 1:
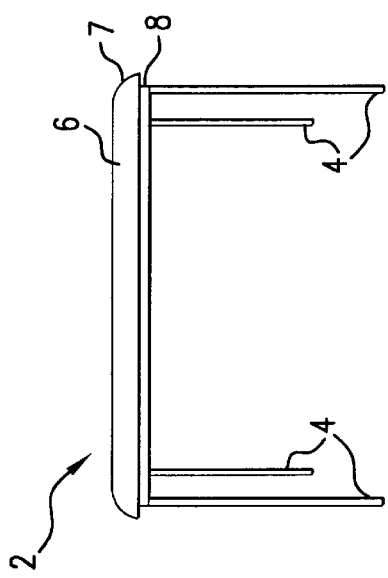
FIG. 1 is a front perspective view of an embodiment of the invention wherein the cap is in a resting position.
Figure 6:
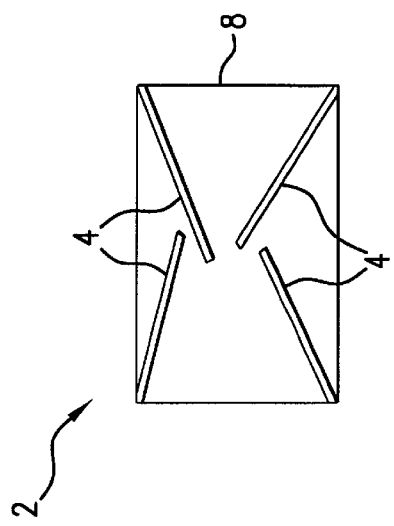
FIG. 6 is a bottom view of an embodiment of the invention wherein table legs are collapsed.

The invention is described first with reference to FIG. 1. A table 2 is disclosed having preferably four legs 4 and a top wall 8. FIG. 6 illustrates a bottom view of the present invention. In FIG. 6, collapsible legs are folded against the bottom of the table. Of course, the present invention may be practiced with greater than or fewer than four legs, or with one or more support walls in combination with, or in lieu of, one or more of the legs. If three legs are used, it is preferred to use legs that angle outwardly from their points of connection with the table in order to add to table stability. The term legs as used herein is not limited only to table legs as that term is generally understood, i.e. generally cylindrical structural elements having diameters or widths substantially less than the diameter or width of the table top wall 8. Rather, the term legs as used herein also includes support walls and other support structures.

Disclosed in FIG. 1 is a tailgate-shaped table cap or cover 6 positioned generally over the table top wall 8. The cap 6 has an outer surface upon which text, symbols, or other designs may be placed. Such designs may be placed on the cap outer surface through the addition of decals, paint, or other means, or they may be more integrally formed in the cap through molding (preferred with use of a plastic cap), stamping (preferred with use of a metallic cap), carving, or other means generally appropriate for use with the selected cap outer-surface material.

Figure 2:
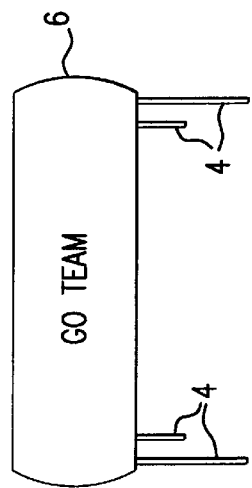
FIG. 2 a front perspective view of an embodiment of the invention wherein the cap is in a vertical or raised position.
Figure 3:
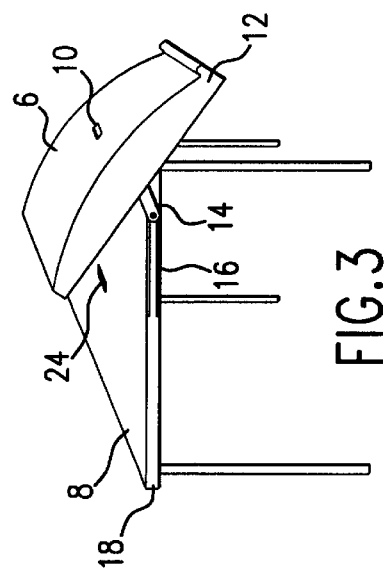
FIG. 3 is a side perspective view of the invention disclosing the cap in an intermediate position.

The cap 6 of the present invention may move between the generally horizontal "closed-cap" position disclosed in FIG. 1 and a "display" position which may comprise a generally vertical position as disclosed in FIG. 2. Depending on the location of the desired audience relative to the table legs and table top wall, the "display" position my be at an angle other-than the generally vertical position shown in FIG. 2. FIG. 3 discloses the cap in an intermediate state wherein the cap 6 is in angled relationship with the table top surface 8. A cap arm 14 is pivotally attached to the interior 20 of the cap side wall 12. From this pivotal attachment, the cap arm 14 extends to the table top surface side wall 18 wherein a sliding connector is moveably combined with a track or housing 16. Any convenient means such as a roller system, a pin and slot, hinged connections, or telescoping rods may be employed to moveably attach the cap to the table, preferably to the table top surface side wall 18. The preferred attachment comprises a cap arm 14 pivotally mounted to the cap 6 and slidingly mounted to the table side wall 18. The sliding mount of the preferred embodiment comprises a track 26 affixed to the table sidewall 18 and a sliding bar 28 contained within the track.

Figure 7:
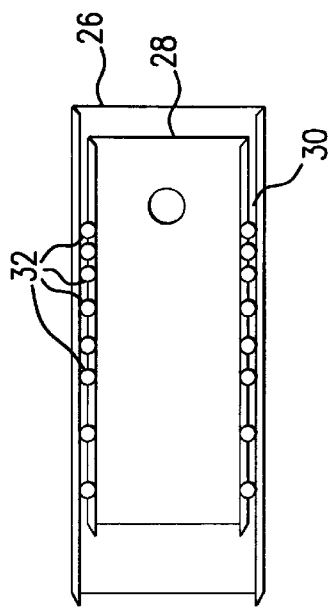
FIG. 7 is a detailed elevation view of a preferred sliding mechanism.

Preferably, the sliding bar 28 is separated from the track by ball bearings 32 in a ball bearing frame 30 that rides between the track 26 and the sliding bar 28. In the alternative, a low friction surface or coating may be used such as Teflon or a greased connection. The cap arm 14 is pivotally mounted to the sliding bar 28. FIG. 7 illustrates this preferred sliding mount mechanism. Such an arrangement allows the cap to be held in a stable position while configured in a vertical arrangement as disclosed in FIGS. 2 and 4. In addition, it provides support to allow the cap to move relatively smoothly between the horizontal and vertical positions.

Figure 4:
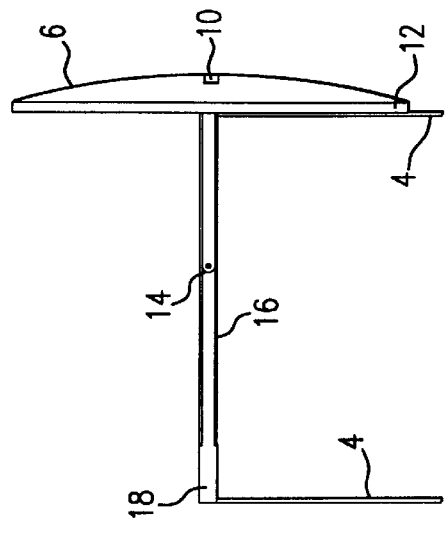
FIG. 4 is a side elevation view of the invention wherein the cap is in a generally vertical display position.
Figure 5:
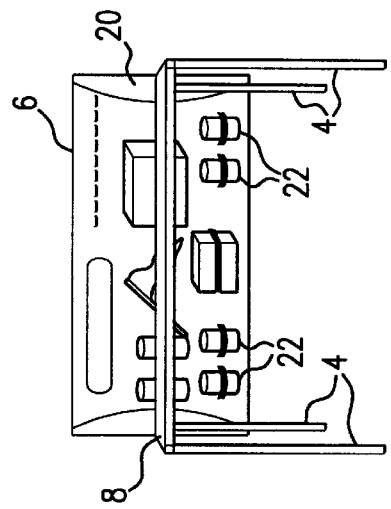
FIG. 5 is a rear elevation view of the present invention wherein the interior cap storage space is illustrated.

Like FIG. 3, FIG. 4 discloses a table, cap, pivotal attachment rod and track. In FIG. 4 the cap is in vertical configuration relative to the table surface. In FIG. 5, a reverse view of FIG. 2 is provided, and the interior of the cap is illustrated. The interior of the cap may include any convenient storage means such as straps, compartments, baskets, snaps, Velcro, slots, or any other storage or attachment mechanisms that are known in the art and which may be convenient for holding the desired goods. Examples of such goods include beverage containers, picnic baskets, seat cushions, pennants, silverware, plates, sporting goods, or other items of use at a picnic or in a tailgate setting. Alternatively, the holders may be adapted to hold brochures, product displays, business cards or other items which may be useful in a commercial setting such as a job fair, trade show, or other professional convention setting.

As disclosed in FIGS. 3 and 4, a handle may be included in the table cap (which preferably comprises or simulates an actual pickup tailgate handle or other handle as is known in the art for use with pickup tailgates). In FIGS. 3 and 4, the handle 10 is positioned so that when the cap is in a horizontal position and lying against the top wall 8 of the table 2, a locking mechanism in communication with the handle 10 may engage a lock receiver 24 that is illustrated on the table surface 8 in FIG. 3. A preferred locking mechanism is the use of an actual pickup truck tailgate handle adapted to manipulate a simple pin that engages and disengages a hole or slot 24 formed in the top surface 8 of the table. Of course, the handle may be used to communicate force to a locking or pin means located on the table sidewalls through cable means, lever means or other force communicating means. If desired, a more complex locking mechanism may be employed including security locking means or power assisted locking means. Typically, such more expensive or complex locking and handle means would not be desired or necessary for tailgate party or other recreational use, but in a commercial setting, such as use with a professional display at a trade show or other event, it may be desirable to include such locking means.

The present invention may employ an actual pickup tailgate for use as the cap 6, or a simulated tailgate such as a molded plastic cap may be used. Preferably, the cap is of a plastic material that is durable yet lightweight such that the cap 6, even when loaded with items 22, is of a weight that may be safely supported by the table 2. Of course, other materials may be employed including aluminum, steel, fiberglass, or any convenient material, so long as the selected material results in a table cap of an appropriate weight relative to the strength and stability of the table portion. A comparison of FIGS. 3 and 4 illustrates that the pivotal attachment 14 may be of a length necessary to ensure that the center of gravity of the table, cap, and pivot-attachment system remains located at a position that will prevent the system from spontaneously tipping or rotating over the table legs 4.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A display table comprising:

a table top wall;

at least one support structure extending downwardly therefrom;

a table cap, said table cap being moveable between a cap position and a display position;

the table cap defines a first side and a second side, said first side comprising an open face defining an interior space, and said second side comprising a display face;

a plurality of storage structures located in said interior space and engaging said first side.

2. A display table comprising:

a table top wall;

a plurality of support structures extendable downwardly from the table top wall;

a table side wall combined with the table top wall;

a support arm having a first end and a second end, said support arm first end being moveably connected to said table side wall;

a supply housing display cap being pivotally connected to said support arm second end;

said supply housing being adapted to rest in first a position generally parallel with and above said table top wall or in a second position generally perpendicular with and beside said table top wall;

said supply housing comprising a storage face and a display face, said storage space having a plurality of storage structures formed therein, said storage structures engaging said storage face.

* * * * *